Figure 1:
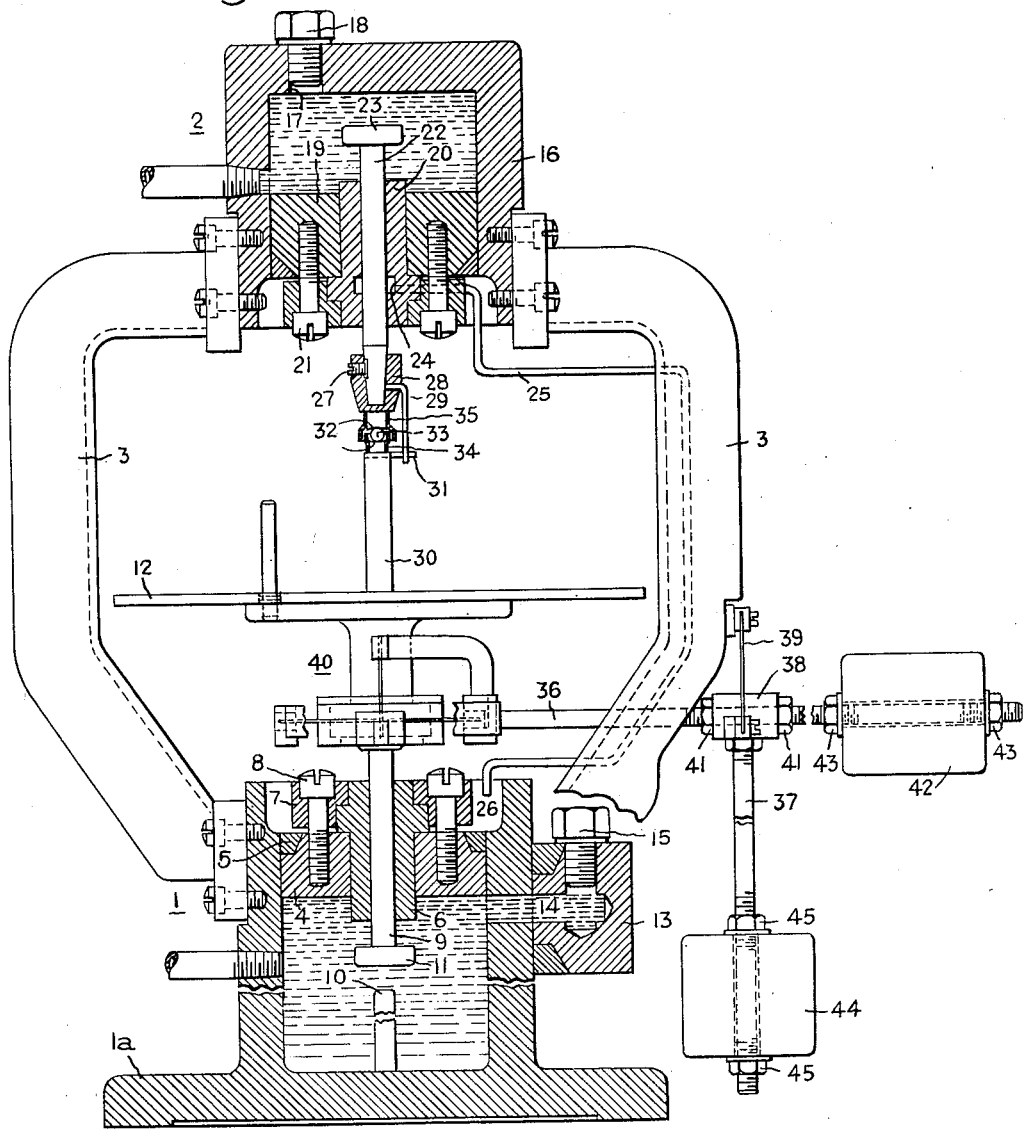

Aug. 14, 1951 W. K. DICKEY ET AL 2,564,470
CONTINUOUS READING DEAD-WEIGHT PRESSURE GAUGE
Filed Feb. 10, 1950 4 Sheets-Sheet 1

Inventors:
William K. Dickey,
Erwin C. Rohde,
by Ernest Britton
Their Attorney.

Inventors:
William K. Dickey,
Erwin C. Rohde,
by Ernest C. Britton
Their Attorney.

Aug. 14, 1951  W. K. DICKEY ET AL  2,564,470
CONTINUOUS READING DEAD-WEIGHT PRESSURE GAUGE
Filed Feb. 10, 1950  4 Sheets-Sheet 3

Inventors
William K. Dickey,
Erwin C. Rohde,
by Ernest C. Britton
Their Attorney.

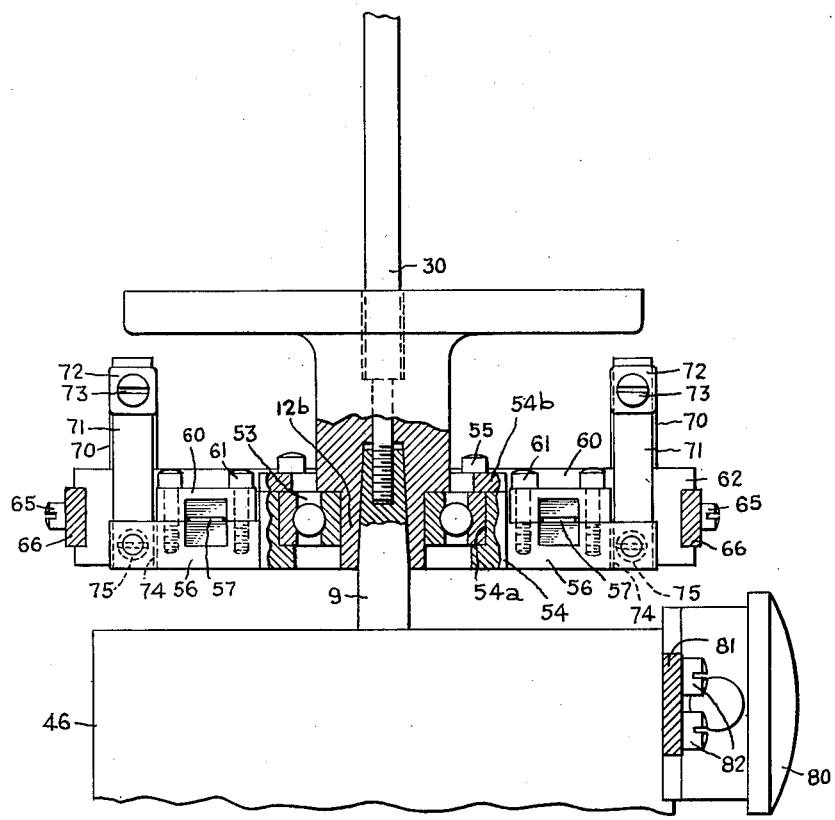
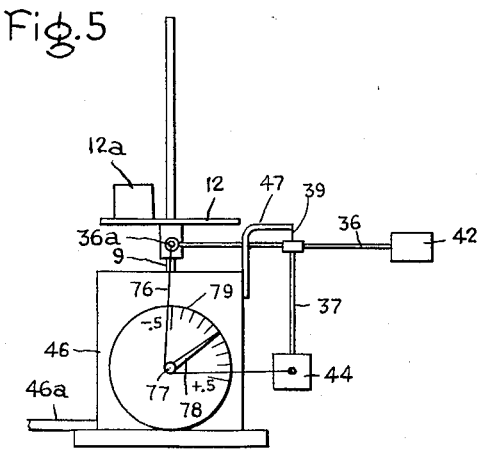

Patented Aug. 14, 1951

2,564,470

UNITED STATES PATENT OFFICE 2,564,470

CONTINUOUS READING DEAD-WEIGHT PRESSURE GAUGE

William K. Dickey, Oklahoma City, Okla., and Erwin C. Rohde, Marblehead, Mass., assignors to General Electric Company, a corporation of New York Application February 10, 1950, Serial No. 143,554

2 Claims. (Cl. 73—388)

This invention relates to pressure gages, particularly to a novel gage of the so-called "deadweight" type, arranged so that readings may be had continuously instead of in discontinuous steps as with the prior art gages.

The well-known dead-weight pressure gage is one of the simplest, yet at the same time most accurate, devices known for the precision measurement of fluid pressures. Because of its simplicity, reliability, and extreme accuracy, it is found extremely valuable in laboratory testing. The dead-weight pressure gages known to the prior art had the serious limitation that they measure pressures only in discrete steps, corresponding to the weight increments added to the plunger of the gage. Furthermore, with the conventional dead-weight gage, there is a certain minimum practicable measurement corresponding to the tare weight of the plunger of the gage. This may mean that the gage is capable only of measuring down to perhaps five pounds per square inch. Also, in using the conventional dead-weight gage, the plunger moves all the way to the end of its stroke when the pressure changes from the exact value corresponding to the weights applied to the plunger. When the plunger thus moves, it is known that the pressure has changed from the exact value corresponding to the weights, but there is no easy way to determine exactly how much the pressure did change. If during the use of the gage, the pressure should fluctuate slightly, increasing and then decreasing below the exact value corresponding to the weights on the plunger, the plunger will move rapidly from one extreme of its range of movement to the other, making accurate readings impossible.

An object of the present invention is to provide a novel dead-weight pressure gage which is not limited to the measurement of pressures in discontinuous steps, but makes possible continuous readings between the steps corresponding to the weights applied to the plunger. A further object is to provide a counter-balance arrangement for the plunger so that readings may be taken substantially down to zero. A still further object is the provision of a continuous reading dead-weight pressure gage in which friction is eliminated so that the gage has all the accuracy of the simpler devices known to the prior art.

Figure 2:
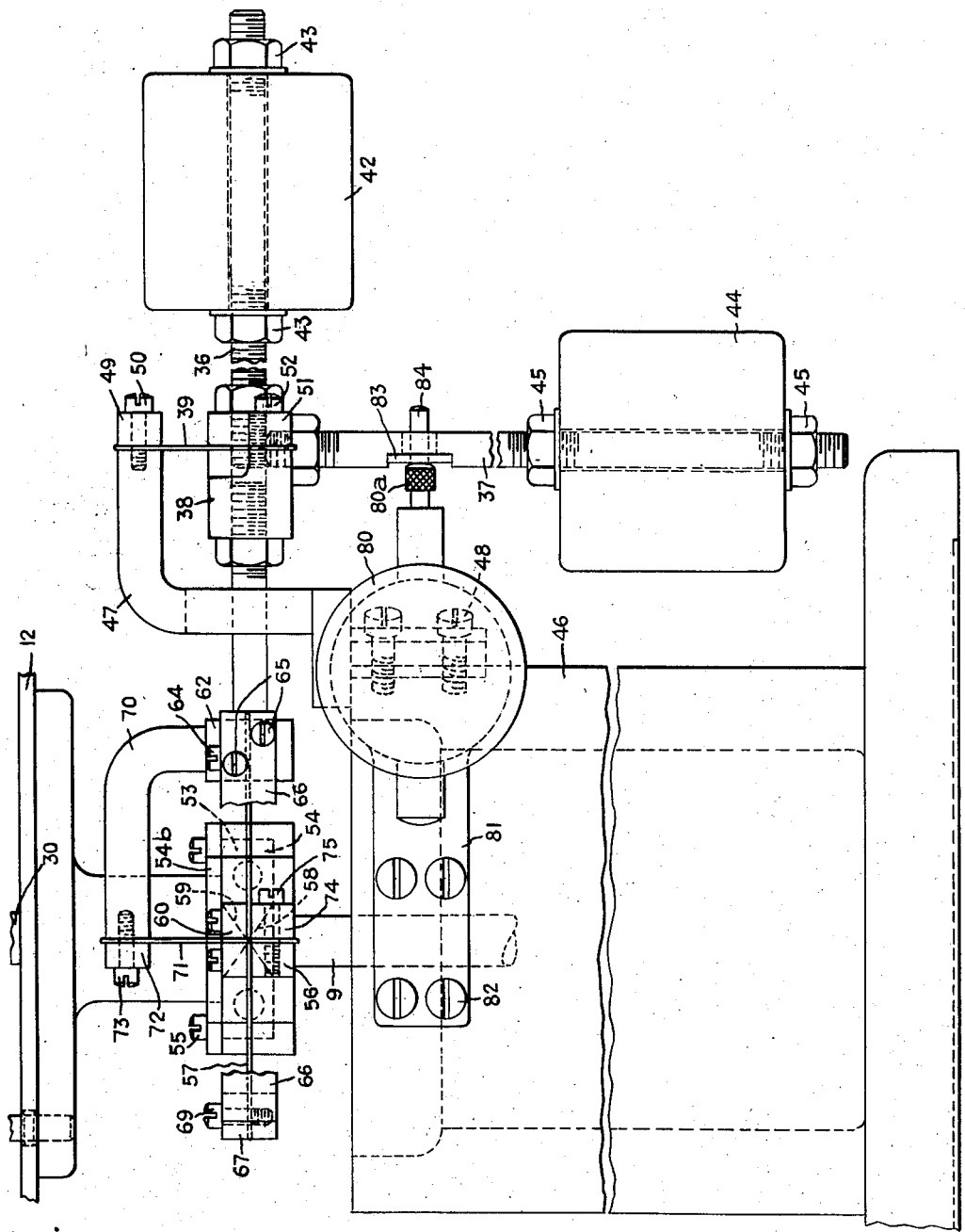
Figure 3:
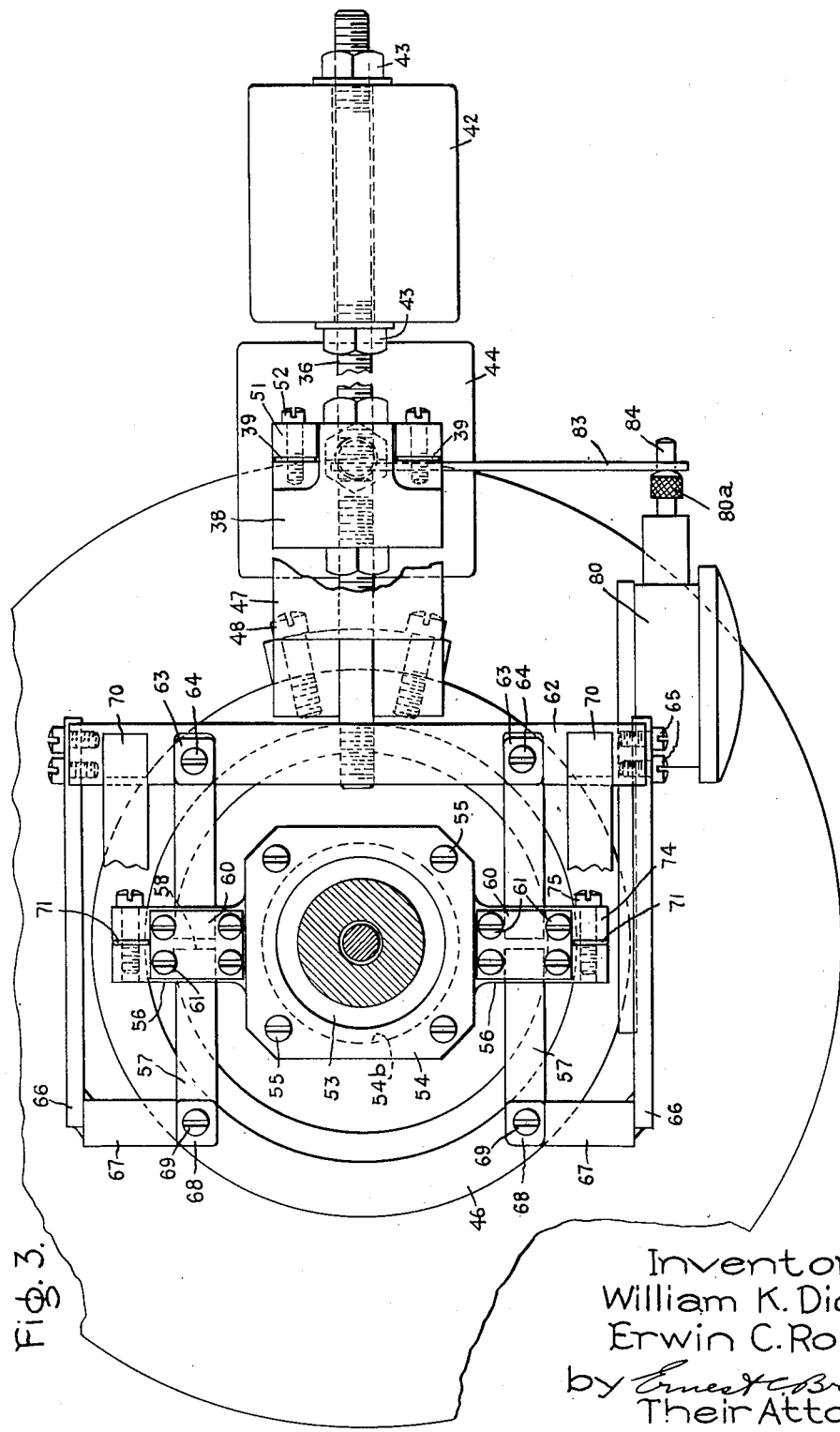

Other objects and advantages will be apparent from the following description taken in connection with the accompanying drawings, in which Fig. 1 illustrates the invention as applied to a double dead-weight pressure gage, as may be used for measuring differential pressures in flow meters; Fig. 2 illustrates a simpler form of the invention for measuring one pressure; Figs. 3 and 4 are top and side views respectively of the gage of Fig. 2 illustrating a novel friction-free suspension employed for certain moving parts; and Fig. 5 is a diagrammatic illustration of an alternate system for indicating the magnitude of the pressure measured.

Referring now more particularly to Fig. 1, the dual dead-weight pressure gage comprises a lower hydraulic cylinder indicated generally at 1 and provided with a supporting base 1a, and an upper hydraulic cylinder 2, these cylinders being interconnected by two or more brackets 3. The top wall of the lower hydraulic cylinder 1 is formed my a head member 4 welded to the cylinder at 5 and having a central opening in which is disposed a carefully machined bushing 6 secured to the head disk 4 by a retaining ring 7 and a plurality of threaded fastenings 8. Slidably disposed in the accurately finished bore of bushing 6 is the vertically reciprocable plunger 9. The lowermost position of plunger 9 is determined by a stop member 10, which may be in the form of a boss projecting from the base of the cylinder, while the uppermost position of the plunger is determined by the engagement of the end flange 11 with the adjacent end surface of bushing 6. The upper end of plunger 9 carries a platform 12 on which a series of calibrated weights are placed. An air vent for the bottom cylinder consists of a projection 13 formed integral with or welded to the side of the cylinder 1 and defining a passage 14 closed by a removable plug member 15.

The upper hydraulic cylinder 2 comprises a casing 16 with a top containing a vent port 17 closed by a removable plug 18. The bottom of the upper cylinder is formed by a ring 19 welded into the cylinder 16 and having a central opening in which is disposed the bushing 20 secured by the screws 21. The upper plunger 22 is also provided with an end flange member 23 for determining the stroke of the plunger. In order to collect leakage along the plunger 22, an annular groove 24 is provided in the bushing 20. Oil collecting in recess 24 is drained by means of a conduit 25 to a circular recess 26 formed in the top of the lower cylinder 1 between the side wall and the ring member 7.

In order to transmit the force applied by the upper plunger 22 to the weight platform 12, the following arrangement is provided. Secured to the lower end of plunger 22, by means of a set screw 27, is a bushing member 28 carrying a downwardly projecting rod 29. Secured in the central portion of the weight platform 12 is an upwardly projecting rod 30 carrying a radially projecting pin 31 which engages the lower end of rod 29 so that rotation of the weight platform 12 will cause the upper plunger 22 to rotate, also, in order to eliminate friction effects in the upper cylinder. The extreme ends of the bushing 28 and rod 30 define opposed spherical surfaces 32 between which is located a thrust ball 33. This connection insures that any eccentric or angular misalignment of the two plungers 9, 22 will introduce no binding effect tending to create friction on the respective plungers. To keep foreign particles from entering the anti-friction thrust surfaces between ball 33 and bearing surfaces 32, a pair of cylindrical shields 34, 35 are provided, the arrangement of which will be obvious from Fig. 1. The radial clearance between these shields is, of course, such that there will at no time be any rubbing contact.

In accordance with the invention, a system of pivoted weights is provided for applying an auxiliary biasing force to the reciprocable plungers. In Fig. 1, this system comprises a T-shaped lever consisting of a horizontal threaded rod 36 with another vertical rod 37 depending from the midportion thereof. The rods 36 and 37 are joined by means of a yoke member 38 suspended freely by a leaf spring 39 from one of the brackets 3. The left-hand end of rod 36 is connected to the lower plunger 9 by means of a novel frictionless suspension indicated generally at 40, the details of which are described more particularly hereinafter in connection with Figs. 2-4. It will be apparent that the yoke 38 may be adjusted longitudinally of the rod 36 by means of the adjusting and locking nuts 41. The right-hand end of rod 36 carries a longitudinally adjustable weight 42, the position of which may be determined by the nuts 43. The lower end of rod 37 carries a second weight 44 which may be adjusted vertically by means of the nuts 45.

The novel friction-free spring suspension for the pivoted weight system is disclosed more fully in Figs. 2, 3, and 4. These show the invention as applied to a single pressure gage having a cylinder 46, which may be similar in construction to the lower cylinder 1 in Fig. 1. It will be obvious that Fig. 2 is the front view of the arrangement, Fig. 3 is the top view, and Fig. 4 is the side view.

Here the friction-free support for the pivot point of the T-lever assembly comprises a bracket member 47, which may be secured by threaded fastenings 48 to the side of cylinder 46. At its extreme upper end, the horizontally extending portion of bracket 47 carries a pair of vertical depending leaf springs 39. These may be conveniently fastened to the end of bracket 47 by small separate blocks 49 secured by screws 50. The lower ends of the springs 39 are similarly clamped to the member 38 by means of small blocks 51 and screws 52. It will be apparent that this spring suspension permits the lever system to rotate in a vertical plane about the point of connection of the springs 39 with the member 38, while preventing any vertical movement of the pivot point, and at the same time preventing any transverse movement in a direction normal to the plane of Fig. 2. The yoke 38 is adjusted longitudinally on rod 36 until the axis of rotation of the weight system is directly below the point of connection of the upper ends of springs 39 to the brackets 47.

The spring suspension by which the left-hand end of the lever 36 is connected with the vertically movable plunger is as follows. As may be seen in Fig. 4, a ball bearing 53 has an inner race carried on the depending hub portion 12b of the weight pan, the outer race 54 being carried in a yoke shown in top view in Fig. 3. This yoke may comprise a lower member 54a having a circular recess in which the outer race of the bearing 53 is located, and a top retainer plate 54b secured to the member 54a by four screws 55.

Secured to or formed integral with the member 54a are diametrically opposed radially extending arms 56 (Fig. 3). Immediately adjacent the yoke 54, the radially extending arms 56 are engaged by a pair of horizontal leaf springs 57. At the location of springs 57, each arm 56 is cut away as indicated by dotted lines 58 in Fig. 3 to form a sort of "blunt knife-edge" shown in dotted lines at 58 in Fig. 2. Opposed to the knife-edge indicated by the lines 58, is a similar knife-edge indicated by the dotted lines 59 in Fig. 2, this knife-edge being formed on a small separate block 60, the top view of which is seen in Fig. 3. This block 60 is secured to the arm 56 by means of four small machine screws 61.

The outer ends of the parallel leaf springs 57 are connected to spaced portions of a U-shaped frame consisting of a main transverse member 62 into the mid-portion of which is threaded the left-hand end of the rod 36. As will be apparent from Fig. 3, the right-hand ends of the springs 57 are secured to the top surface of the transverse member 62 by a clamping block 63 and a suitable machine screw 64. At the extreme ends of transverse member 62, pairs of screws 65 secure the parallel arms 66. The left-hand ends of the arms 66 (Fig. 3) are secured to inwardly extending arm portions 67 the ends of which are connected to the adjacent ends of the leaf springs 67 by means of clamping blocks 68 and screws 69.

Secured to the upper surface of the transverse member 62 at a location between the rod 36 and the end arms 66, are a pair of L-shaped arms 70 to the free ends of which are connected a pair of parallel vertical leaf springs 71. Each of these springs may be secured by a clamping block 72 and a machine screw 73 (Fig. 2). The lower ends of the vertical springs 71 are secured by the clamping blocks 74 and screws 75 to the extreme end portions of the radially extending arms 56.

The leaf springs 39, 71, 57, may be made of ordinary spring steel and are very thin, only about .005 inch thick. These springs are sufficiently wide to have some rigidity in the plane of the spring but are extremely flexible with respect to bending in a direction transverse to the plane of the spring. Thus the springs 39 provide an extremely flexible frictionless suspension for the pivoted weight system. The vertical springs 71 cause the end of rod 36 to be displaced vertically in accordance with vertical movements of the plunger 9. The function of the springs 57 is to counteract the tendency of the cage 54 to rotate when the plunger 9 rotates. Another function of springs 57 is to stabilize the pivoted lever 36 against movement in a horizontal plane towards and away from the plunger 9. Thus the pivoted T-lever carrying the weights 42, 44 is suspended freely so as to rotate without friction in a vertical plane, the degree of rotation corresponding exactly with vertical movement of the plunger 9.

The method of operation may be appreciated more readily from a consideration of the simplified diagrammatic representation of the pivoted lever arrangement shown in Fig. 5. Here the spring suspension for the lever 36 is provided by the vertical spring 39 and the connecting means between the left-hand end of lever 36 and the plunger 9 is represented diagrammatically by a pivot 36a. As will be appreciated by those skilled in the art, the plunger 9 and weight pan 12 have a certain "tare weight" which must be supported by the hydraulic pressure in cylinder 46. Thus the minimum pressure which such a gage can measure, without the invention, is that corresponding to this tare weight of the moving parts. The function of the adjustable weight 42 is to counter-balance this tare weight. Accordingly, the weight 42 will be adjusted longitudinally on the rod 36 until rod 36 remains exactly horizontal when there is no calibrated weight 12a on the weight pan 12, and with the plunger 9 at the middle of its stroke.

If now a weight 12a is applied to the weight pan and the hydraulic pressure in the cylinder 46 increased to the exact value corresponding to the calibrated weight 12a, then the lever 36 will again be in horizontal position and the plunger 9 at the middle of its stroke. In this condition, the weight 44 hangs exactly below the point of suspension defined by the vertical spring 39 achieved by proper adjustment of yoke 38 on rod 36 (see Fig. 2), with the result that the weight 44 introduces no biasing forces into the system. If now the hydraulic pressure in cylinder 46 should change, the plunger 9 will tend to move from its mid-position. Suppose for instance the hydraulic pressure should increase slightly. The plunger 9 will begin to move upwardly, with the result that the pivoted lever 36 rotates clockwise and the weight 44 moves to the left from its neutral position directly below the suspension spring 39. Gravity now acts on the weight 44 to introduce a force tending to rotate the lever system counter-clockwise. This force is communicated to the plunger 9 through the pivot 36a, and this force, of course, increases as the displacement of weight 44 from its neutral position increases. The plunger 9 will continue to rise until the counter-balancing force exerted by the weight 44 is sufficient to bring the plunger 9 to a new equilibrium position. Thus the distance the plunger rises and the corresponding displacement of the weight 44 from its neutral position is a measure of the increase in the pressure in cylinder 46.

It only remains to provide a means for measuring the displacement of the plunger 9 and weight 44 in order to have means for reading values of pressure intermediate those corresponding to the increments of weight added to the weight pan 12.

One such measuring arrangement is indicated diagrammatically in Fig. 5. This comprises a flexible metal ribbon 76 having one end connected at the pivot 36a, the other connected to the weight 44, and an intermediate portion passing around a drum 77 to which is secured a pointer 78 cooperating with a calibrated scale 79. If for instance the smallest weight to be applied to the weight pan 12 represents one-half pound per square inch increments, then the scale 79 may be graduated in tenths of a pound per square inch, there being five graduations on either side of the neutral position. The scale 79 may, of course, be conveniently calibrated by adding accurately determined small increments of weights to the pan 12 and marking the scale accordingly. Experience shows that for best accuracy, it is practicable to arrange the weight system so that the rods 36, 37 rotate through an arc of only about plus or minus ten degrees. If less accuracy can be tolerated, then the suspension may be re-designed so that greater deflections of the weight 44 may be achieved.

The arrangement described above in connection with Figs. 2–4 has been found capable of measuring pressures as low as .02 pound per square inch; and the accuracy is on the order of plus or minus .02 pound per square inch over a range up to values on the order of 1,000 pounds per square inch.

A more effective and practical way of measuring the displacement of the pivoted weight system is illustrated in Figs. 2–4. This comprises a conventional dial type micrometer, the outline of which is indicated at 80, supported by a bracket 81 secured by machine screws 82 to the side of cylinder 46. The actuating spindle 80a is engaged by a laterally projecting arm 83 brazed to a flat portion of the depending vertical rod 37. Since the biasing spring usually provided in dial micrometers of this type would introduce an unwanted force into the system, that spring should be removed from the micrometer. Then in order to keep the actuating spindle 80a in contact with the arm 83, a small permanent magnet, made for instance of the material known to the trade as "Alnico" is secured to the arm 83 as shown at 84. This magnet attracts the spindle 80a and holds it firmly in engagement with arm 83. It will be apparent that the dial of indicator 80 may be calibrated as described above in connection with Fig. 5.

In order to still further eliminate the effects of friction from the system, various known optical indicating arrangements may be used to measure the displacement of the pivoted lever system instead of the means disclosed in Figs. 2, 5.

It will be apparent from the above description that the invention provides a highly accurate dead-weight pressure gage capable of measuring substantially down to zero and giving continuous readings, as compared with the discontinuous measurements necessary with the prior art devices.

While only a few modifications and adaptations of the invention have been described, it will be obvious to those skilled in the art that many changes may be made and we desire to cover by the appended claims all such modifications as fall within the true spirit and scope of the invention.

What we claim as new and desire to secure by Letters Patent of the United States is:

1. In a dead weight pressure gage having a hydraulic cylinder and a vertically reciprocable plunger carrying a pan adapted to receive calibrated weights in preselected increments, the combination of variable biasing means for continuously measuring pressures intermediate those corresponding to the increments of weight added to the pan, said means comprising a pivoted weight system including a pair of oppositely extending horizontal lever arms and a vertical lever arm depending from the juncture of the horizontal arms, frictionless suspension means supporting the system for free oscillation about a horizontal axis through said juncture, frictionless connecting means for causing the end of one of the horizontal arms to move substantially vertically in accordance with deviations of the plunger from its neutral equilibrium position, a first weight carried by the other horizontal arm for counterbalancing the first arm and the tare weight of the plunger and pan, a second weight carried by the vertical arm and having a neutral position directly below said horizontal axis, whereby movement of the plunger above or below its neutral equilibrium position causes the second weight to produce a biasing force tending to move the plunger back towards equilibrium position, said force being a function of the displacement of the second weight from the neutral position, indicating means for measuring the displacement of the weight from the neutral position to indicate the force exerted on the plunger by the pivoted weight system, the suspension for the pivoted weight system comprising a bracket connected to the hydraulic cylinder, a pair of thin flexible leaf springs disposed in a common vertical plane and transversely spaced at opposite sides of the pivoted weight system, means connecting the upper ends of the springs to said bracket and means connecting the lower ends of the springs to the weight system substantially at the juncture of the three arms.

2. In a dead weight pressure gage having a hydraulic cylinder and a vertically reciprocable plunger carrying a pan adapted to receive calibrated weights in preselected increments, the combination of variable biasing means for continuously measuring pressures intermediate those corresponding to the increments of weight added to the pan, said means comprising a pivoted weight system including a pair of oppositely extending horizontal lever arms and a vertical lever arm depending from the juncture of the horizontal arms, frictionless suspension means supporting the system for free oscillation about a horizontal axis through said juncture, frictionless connecting means for causing the end of one of the horizontal arms to move substantially vertically in accordance with deviations of the plunger from its neutral equilibrium position, a first weight carried by the other horizontal arm for counterbalancing the first arm and the tare weight of the plunger and pan, a second weight carried by the vertical arm and having a neutral position directly below said horizontal axis, whereby movement of the plunger above or below its neutral equilibrium position causes the second weight to produce a biasing force tending to move the plunger back towards equilibrium position, said force being a function of the displacement of the second weight from the neutral position, indicating means for measuring the displacement of the weight from the neutral position to indicate the force exerted on the plunger by the pivoted weight system, the frictionless connecting means between the pivoted weight system and the plunger comprising an anti-friction bearing with an inner race surrounding the plunger and an outer race carried in a cage having diametrically opposed radially extending arms, a U-shaped frame secured to a horizontal arm of the weight system with the parallel leg portions of the frame disposed at opposite sides of the plunger adjacent said radial arms, the U-frame having also a pair of transversely spaced L-shaped brackets each having one leg secured to the U-frame with the other leg having an end portion disposed above said radial arms, a first pair of transversely spaced leaf springs disposed in a common vertical plane through the axis of the plunger, each of said leaf springs having an upper end portion secured to the upper end portion of the respective L-shaped brackets and a lower end portion connected to the respective radial arms, and a second pair of transversely spaced leaf springs disposed in a common horizontal plane at either side of said cage, each of the second springs having end portions secured to spaced portions of the U-frame and a mid-portion connected to one of the radial arms, whereby said first vertical springs position the U-frame as a function of vertical deviation of the plunger from its neutral equilibrium position, the horizontal springs serving to stabilize the pivoted weight system both in a direction transverse to the axis of the plunger and in a radial direction and also resisting the tendency of the U-frame to rotate in a horizontal plane when the plunger rotates.

WILLIAM K. DICKEY.
ERWIN C. ROHDE.

REFERENCES CITED

The following references are of record in the file of this patent:

UNITED STATES PATENTS

| Number | Name | Date |
|---|---|---|
| 278,902 | Emery | June 5, 1883 |
| 1,995,550 | Scott | Mar. 26, 1935 |
| 2,013,252 | Pigott | Sept. 3, 1935 |
| 2,112,570 | Spacher | Mar. 29, 1938 |
| 2,361,723 | Wallace | Oct. 31, 1944 |

OTHER REFERENCES

Behar (article) Instruments; vol. 4, February 1931. Pg. 80.

De Juhasz (article) Instruments; vol. 6, July 1933. Pg. 142.